United States Patent
Li et al.

(10) Patent No.: US 8,943,811 B2
(45) Date of Patent: Feb. 3, 2015

(54) PEROVSKITE-BASED CATALYSTS, CATALYST COMBINATIONS AND METHODS OF MAKING AND USING THE SAME

(75) Inventors: Wei Li, Troy, MI (US); David B. Brown, Brighton, MI (US); Chang H Kim, Rochester, MI (US); Gongshin Qi, Troy, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 603 days.

(21) Appl. No.: 12/975,419

(22) Filed: Dec. 22, 2010

(65) Prior Publication Data

US 2012/0159935 A1 Jun. 28, 2012

(51) Int. Cl.

| | |
|---|---|
| *F01N 3/00* | (2006.01) |
| *B01D 53/94* | (2006.01) |
| *B01J 23/00* | (2006.01) |
| *B01J 23/34* | (2006.01) |
| *B01J 23/83* | (2006.01) |
| *B01J 35/00* | (2006.01) |
| *B01J 37/02* | (2006.01) |
| *B01J 37/08* | (2006.01) |

(52) U.S. Cl.
CPC ........... *B01D 53/9422* (2013.01); *B01J 23/002* (2013.01); *B01J 23/34* (2013.01); *B01J 23/83* (2013.01); *B01J 35/0006* (2013.01); *B01J 37/0215* (2013.01); *B01J 37/0228* (2013.01); *B01J 37/08* (2013.01); *B01D 53/9459* (2013.01); *B01D 2255/1021* (2013.01); *B01D 2255/1023* (2013.01); *B01D 2255/1025* (2013.01); *B01D 2255/1026* (2013.01); *B01D 2255/204* (2013.01); *B01D 2255/402* (2013.01); *B01J 2255/91* (2013.01); *B01J 2523/00* (2013.01); *Y02C 20/10* (2013.01)

USPC .................................. 60/297; 60/274; 60/299

(58) Field of Classification Search
USPC ..................................................... 60/274–324
See application file for complete search history.

(56) References Cited

U.S. PATENT DOCUMENTS

| | | | |
|---|---|---|---|
| 4,902,487 A | | 2/1990 | Cooper et al. |
| 6,150,299 A | * | 11/2000 | Umemoto et al. ............ 502/304 |

(Continued)

FOREIGN PATENT DOCUMENTS

| | | |
|---|---|---|
| CN | 101837244 A | 9/2010 |
| DE | 69916276 T2 | 4/2005 |

OTHER PUBLICATIONS

German Office Action dated Jul. 4, 2013; Applicant: GM Global Technology Operations LLC; Application No. 10 2011 121 222.5; 6 pages.

(Continued)

*Primary Examiner* — Jesse Bogue
(74) *Attorney, Agent, or Firm* — BrooksGroup

(57) ABSTRACT

One embodiment of the invention may include a method comprising providing a product comprising a substrate comprising a perovskite catalyst, $NO_x$ stored in or on the substrate and particulate matter in or on the substrate; releasing at least some of the stored $NO_x$ and oxidizing the released NOx to form $NO_2$, and reacting the $NO_2$ with carbon in the particulate matter to form at least one of CO or $CO_2$.

22 Claims, 3 Drawing Sheets

(56) References Cited

U.S. PATENT DOCUMENTS

| | | | |
|---|---|---|---|
| 6,180,075 B1* | 1/2001 | Lindner et al. | 423/213.2 |
| 6,335,305 B1* | 1/2002 | Suzuki et al. | 502/325 |
| 6,692,712 B1* | 2/2004 | Andersen | 423/239.1 |
| 6,718,757 B2* | 4/2004 | Khair et al. | 60/286 |
| 6,949,235 B2* | 9/2005 | Brown et al. | 423/213.2 |
| 7,205,257 B2* | 4/2007 | Tanaka et al. | 502/327 |
| 7,553,464 B2* | 6/2009 | Kim et al. | 423/263 |
| 7,578,455 B2* | 8/2009 | Kim et al. | 241/5 |
| 7,832,203 B2* | 11/2010 | Chiffey et al. | 60/297 |
| 8,475,752 B2* | 7/2013 | Wan | 423/213.2 |
| 2007/0089403 A1* | 4/2007 | Pfeifer et al. | 60/286 |
| 2007/0105715 A1 | 5/2007 | Suda et al. | |
| 2008/0242535 A1* | 10/2008 | Liu et al. | 502/232 |
| 2009/0191108 A1* | 7/2009 | Blanchard et al. | 423/239.1 |
| 2010/0086458 A1* | 4/2010 | Kim et al. | 423/239.1 |
| 2010/0229533 A1* | 9/2010 | Li et al. | 60/274 |
| 2010/0233045 A1* | 9/2010 | Kim et al. | 422/177 |

OTHER PUBLICATIONS

Diesel pariticulate filter ; from Wikipedia http://en.wikipedia.org/wiki/Diesel_pariculate_filter ; 8 pages.

Science 327 ; (1624-1627) ; 2010.

Chinese Office Action dated Jan. 28, 2014, Applicant: GM Global Technology Operations LLC, Application No. 201110463202.6, 9 pages.

* cited by examiner

PEROVSKITE-BASED CATALYSTS, CATALYST COMBINATIONS AND METHODS OF MAKING AND USING THE SAME

TECHNICAL FIELD

The field to which the disclosure generally relates to includes coated perovskite-based catalysts, catalyst combinations, and methods of making and using the same.

BACKGROUND

Substrates having particulate matter or soot thereon can be treated with oxygen in the presence of a platinum catalyst to burn off the particulate matter or soot.

SUMMARY OF ILLUSTRATIVE EMBODIMENTS OF THE INVENTION

One embodiment of the invention may include a method comprising providing a product comprising a substrate comprising a perovskite catalyst, $NO_x$ stored in or on the substrate and particulate matter in or on the substrate; releasing at least some of the stored $NO_x$ and oxidizing the released NOx to form $NO_2$, and reacting the $NO_2$ with carbon in the particulate matter to form at least one of CO or $CO_2$.

In another embodiment the substrate further comprises a noble metal catalyst.

In another embodiment the substrate further comprises platinum.

In one embodiment the substrate does not include a catalyst other than the perovskite catalyst.

In one embodiment the product may further comprise a $NO_x$ trap material.

One embodiment of the invention includes a method comprising providing a particulate filter comprising a substrate comprising a perovskite catalyst, $NO_x$ stored in or on the substrate and particulate matter in or on the substrate; releasing at least some of the stored $NO_x$ and oxidizing the released $NO_x$ to form $NO_2$, and reacting the $NO_2$ with carbon in the particulate matter to form at least one of CO or $CO_2$.

In one embodiment the particulate filter is located in a combustion engine exhaust system.

In one embodiment, the perovskite catalyst may have the general formula $ABO_3$, $AA'BO_3$, $ABB'O_3$, or $AA'BB'O_3$. The perovskite catalyst may be the only catalyst in or on the substrate or a second non-perovskite catalyst may include at least one of palladium, platinum, rhodium, ruthenium or a catalyst system including one or more of the same or alloys thereof. In one embodiment, the $NO_x$ trap material may include at least one of the alkali metals, alkaline earth metals (such as barium, calcium, potassium, or sodium).

One embodiment of the invention may include a product comprising a particulate filter and $NO_x$ storage (trap) material combination, wherein the particulate filter comprises a substrate constructed and arranged to trap particulate matter in a gas stream flowing in, through or over the substrate, and further comprising a $NO_x$ storage material in, on or over the substrate and a perovskite catalyst in, on or over the substrate.

In one embodiment the perovskite catalyst and $NO_x$ storage material may be in the same layer. In another embodiment the perovskite catalyst and $NO_x$ trap material may be in different layers or sections of the substrate or product.

One embodiment of the invention may include a product comprising a particulate filter comprising a catalyst combination comprising a perovskite catalyst and a second catalyst that is not a perovskite catalyst. In one embodiment, the perovskite catalyst may have the general formula $ABO_3$, $AA'BO_3$, $ABB'O_3$, or $AA'BB'O_3$. In another embodiment, the second non-perovskite catalyst may comprise at least one metal from the precious metal or noble metal group of the periodic table. In another embodiment, the second non-perovskite catalyst may comprise at least one of palladium, platinum, rhodium or ruthenium, or catalyst systems including the same. In one embodiment, a catalyst combination may include a perovskite catalyst and a second non-perovskite catalyst, wherein the second non-perovskite catalyst having a loading of about 1-160 $g/ft^3$, 1-80 $g/ft^3$, 1-60 $g/ft^3$, 1-40 $g/ft^3$, 1-20 $g/ft^3$, or a loading within such ranges. In one embodiment of a catalyst combination comprising a second non-perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second non-perovskite catalyst, wherein the second non-perovskite catalyst comprises platinum having a loading of about 1-160 $g/ft^{3}$' 1-80 $g/ft^3$, 1-20 $g/ft^3$, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second non-perovskite catalyst, wherein the second non-perovskite catalyst comprises palladium having a loading of about 5-100 $g/ft^{3}$' or 10-60 $g/ft^3$, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may not be supported by a substrate but may be formed into substrates having any of a variety of configurations including, but not limited to, flat panels, beads, pellets, or reactor packing material shapes.

Another embodiment may include a perovskite catalyst of the general formula $ABO_3$ in a catalytic oxidation reactor for oxidizing nitric oxide in an exhaust stream of a lean burning hydrocarbon fueled power source, wherein A represents a rare earth metal from the Lanthanide Series and/or an alkaline-earth metal, and wherein B represents a transition metal.

In another embodiment, the catalytic performance of the perovskite catalyst of the general formula $ABO_3$ as described above may be enhanced by the substitution of a small amount of a promoter material for a portion of at least one of element A or element B in the catalytic formulation.

Another embodiment may include an exhaust system for reducing $NO_x$ emissions including a catalytic oxidation reactor having the perovskite catalyst of the general formula $ABO_3$ or a modified formula of $ABO_3$ wherein a small amount of a promoter material is substituted for a portion of at least one of element A or element B.

One embodiment of the invention may include a method comprising providing particulate filter and $NO_x$ storage material combination comprising a substrate constructed and arranged to trap particulate matter in a gas stream flowing in, through or over the substrate and a trap material in, on or over the substrate, and a perovskite catalyst in, on or over the substrate; and flowing a gas stream comprising $NO_x$ and particulate matter through or over a product so that particulate matter is trapped in the product and $NO_x$ is stored in the product; and thereafter selectively causing the $NO_x$ to be released and converting the $NO_x$ to $NO_2$ and reacting the $NO_2$ with carbon in the particulate matter to produce at least one of CO or $CO_2$ in gaseous form.

One embodiment of the invention may include a method comprising operating a combustion engine to produce an exhaust gas including carbon monoxide, hydrocarbons, oxides of nitrogen and particulate matter, and flow exhaust gas through a catalytic converter including a catalyst constructed and arranged to promote chemical reactions to convert at least a portion of one of the carbon monoxide or hydrocarbons to more desirable compounds or materials for discharging to the atmosphere to provide a converted exhaust stream, and thereafter flowing the converted exhaust stream through a particulate filter comprising a perovskite catalyst and a $NO_x$ storage material so that particulate matter from the converted exhaust stream is trapped in the particulate filter and $NO_x$ is stored in the $NO_x$ storage material, and thereafter selectively causing the $NO_x$ to be released and converting the $NO_x$ to $NO_2$ and reacting the $NO_2$ with carbon in the particulate matter to produce at least one of CO or $CO_2$ in gaseous form.

Some embodiments may use combinations of a perovskite catalyst, $NO_x$ storage materials with or without non-perovskite catalyst in a product which may be constructed and arranged to trap particulate matter as desired. Such embodiments may be used to treat gas streams such as, but not limited to, exhaust gas from an engine utilizing gasoline, diesel or other fuels, gases from the operation of a chemical plant or chemical processing equipment, or gases from chemical laboratories or medical devices.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein.

DETAILED DESCRIPTION OF ILLUSTRATIVE EMBODIMENTS

The following description of the embodiment(s) is merely illustrative in nature and is in no way intended to limit the invention, its application, or uses.

Figure 1:
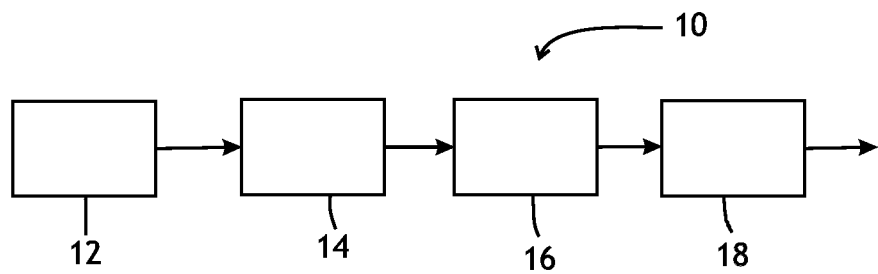
FIG. 1 is a schematic illustration of a combustion engine and exhaust treatment system including a combination particulate trap and $NO_x$ storage component according to one embodiment of the invention.

FIG. 1 is a schematic illustration of a combustion engine and exhaust treatment system 10 including a combination particulate trap and $NO_x$ storage component 18 according to one embodiment of the invention. The system 10 may include a combustion engine producing exhaust gas which flows in the direction of the arrows in FIG. 1. Downstream an optional turbocharger 14 may be provided in communication with the exhaust and constructed and arranged to compress air entering the combustion engine. A catalytic converter may be provided downstream of the engine 10 and the turbocharger 14. The catalytic converter may include platinum and palladium to convert the carbon monoxide and hydrocarbons in the exhaust to carbon dioxide and water. A particulate filter 18 may be provided downstream of the catalytic converter 16. The particulate filter 18 may include a perovskite catalyst and a $NO_x$ storage material and is constructed and arranged so that particulate matter from the converted exhaust stream is trapped particulate filter and $NO_x$ is stored in the $NO_x$ storage material.

In one embodiment the perovskite catalyst and $NO_x$ storage material may be in the same layer. In another embodiment the perovskite catalyst and $NO_x$ storage material may be in different layers or sections of the substrate or product.

One embodiment of the invention may include a method comprising operating a combustion engine 12 to produce an exhaust gas including carbon monoxide, hydrocarbons, oxides of nitrogen and particulate matter, and flow exhaust gas through a catalytic converter 16 including a catalyst constructed and arranged to promote chemical reactions to convert at least a portion of one of the carbon monoxide or hydrocarbons to more desirable compounds or materials for discharging to the atmosphere to provide a converted exhaust stream, and thereafter flowing the converted exhaust stream through a particulate filter 18 comprising a perovskite catalyst and a $NO_x$ storage material so that particulate matter from the converted exhaust stream is trapped in the particulate filter and $NO_x$ is stored in the $NO_x$ storage material, and thereafter selectively causing the $NO_x$ to be released and reacting the $NO_x$ with carbon in the particulate matter to produce at least one of CO or $CO_2$ in gaseous form.

The $NO_x$ stored in the $NO_x$ trap may be purged or the $NO_x$ trap material may be regenerated by any of a variety of ways known to those skilled in the art including, but not limited to, injecting fuel or another reactant into the exhaust stream upstream of the $NO_x$ trap material causing the stored $NO_x$ to be released and react with the carbon in the particulate matter.

In one embodiment, rare earth based oxides may be used as nitrogen trap materials including $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

Figure 2:
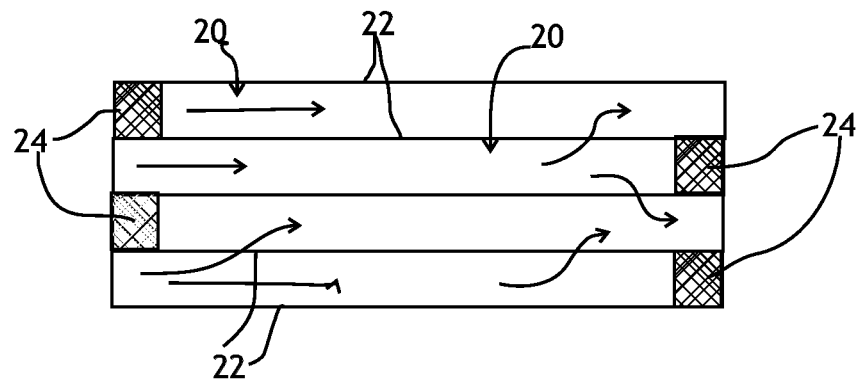
FIG. 2 sectional view of a portion of a filter body including a perovskite catalyst wherein the filter body is constructed and arranged to provide a plurality of exhaust gas flow cells defined in part by porous cell walls with blocking plug in at least some of the cells according to one embodiment of the invention.

FIG. 2 illustrates one embodiment of the invention which may include a filter 18 including a plurality of gas flow cells 20 defined by porous walls for exhaust gas to flow in and out of and plugs 24 to redirect the flow of exhaust gas and constructed and arranged so that particulate matter in the exhaust gas drops out of the gas stream and is trapped in the filter.

Figure 3:
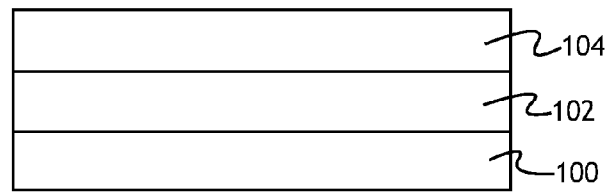
FIG. 3 illustrates a product including a substrate having a perovskite catalyst and nitrogen trap material on the substrate and a hydrocarbon reduction and $NO_x$ reduction catalyst over the perovskite catalyst and $NO_x$ trap material according to one embodiment of the invention.

In one embodiment, the catalytic converter catalyst may be included in the particulate filter and $NO_x$ storage material component or same housing. FIG. 3 illustrates one embodiment of the invention which may include a product or system including a substrate 100 which may be solid or porous. A first layer or zone 102 including a perovskite catalyst and $NO_x$ storage material may be coated directly on the substrate or over the substrate and a second layer or zone 104 including a hydrocarbon and $NO_x$ reduction catalyst coated directly on the first layer or overlying the first layer. The first layer or zone 102 and the second layer or zone 104 are porous so that exhaust gas flowing over the same may flow through the first and second layers or zones. The perovskite catalyst, $NO_x$ storage material, hydrocarbon and $NO_x$ reduction catalyst may each be in a separate layer or may be combined into one or two layers.

Figure 4:
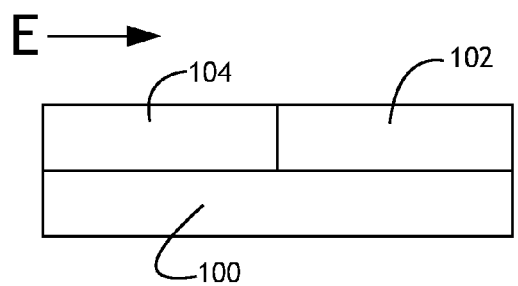
FIG. 4 is a sectional view of a substrate having a coating on a first portion thereof for hydrocarbon reduction and $NO_x$ reduction in a second portion downstream thereof including a perovskite catalyst according to one embodiment of the invention.

FIG. 4 illustrates an alternative embodiment including a substrate 100 having a second zone 104 including a hydrocarbon reduction and $NO_x$ reduction catalyst coated directly thereon or over the substrate in an upstream position of the direction of the exhaust stream to be treated (shown by arrow E), and a first layer or zone 102 downstream of the first layer or zone 104. The second layer or zone 104 may include a perovskite and nitrogen trap material coated directly on the substrate 100 or over the same.

Figure 5:
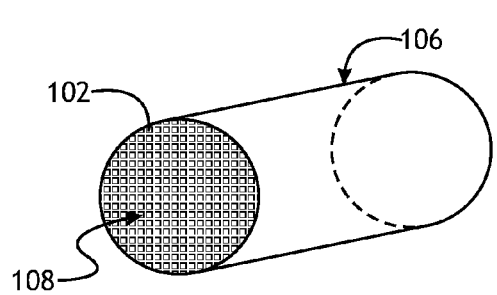
FIG. 5 illustrates a flow-through monolith having exhaust gas through holes formed therein and a coating thereon defining a first zone including a hydrocarbon reduction and $NO_x$ reduction catalyst and a second zone including a perovskite catalyst according to one embodiment of the invention.
Figure 6:
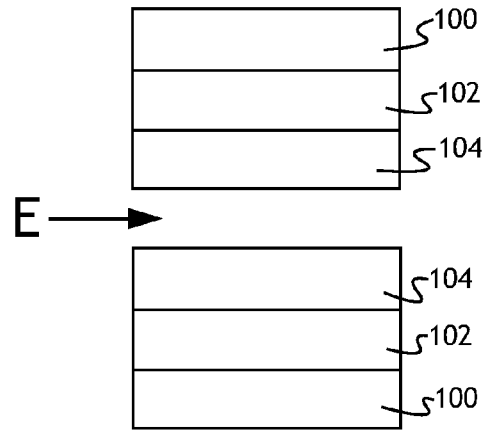
FIG. 6 illustrates a section of a flow-through monolith having a substrate, a perovskite catalyst and $NO_x$ trap material on the substrate and a hydrocarbon reduction and $NO_x$ reduction catalyst over the same according to one embodiment of the invention.

FIG. 5 illustrates a coated flow-through monolith 106 which may include a support material made from ceramic, metal or other suitable material having a plurality of through holes 108 formed therein for the flow of exhaust gas. The monolith 106 may include a first coating or zone 102 formed on the structural material substrate of the monolith, and a second layer or zone 104 coated directly on or over the first layer 102 as shown in FIG. 6.

Figure 7:
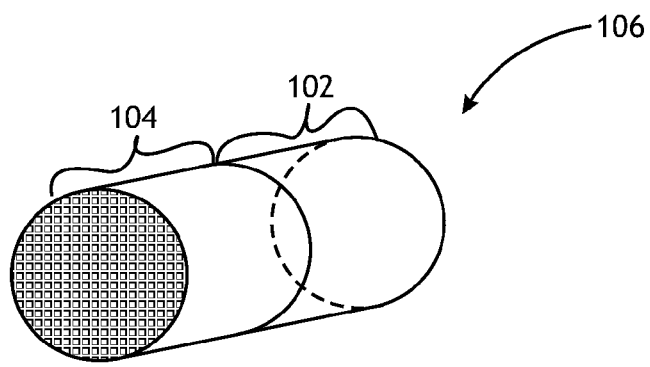
FIG. 7 illustrates a flow-through monolith having a first zone including a hydrocarbon reduction and $NO_x$ reduction catalyst coated on a substrate of the monolith and a second downstream zone having a perovskite catalyst and $NO_x$ storage material coated on a second portion of the monolith according to one embodiment of the invention.

In an alternative embodiment, the monolith 106 as shown in FIG. 7 may include a first zone 104 having the hydrocarbon reduction and $NO_x$ reduction catalyst coated thereon, and a second zone 102 downstream of the first zone 104 and having a perovskite and $NO_x$ trap material coated thereon so that gas flowing through the monolith first flows over and/or through the hydrocarbon reduction and $NO_x$ reduction catalyst, and thereafter flows through the perovskite and $NO_x$ trap material for $NO_x$ oxidation and storage.

Figure 8:
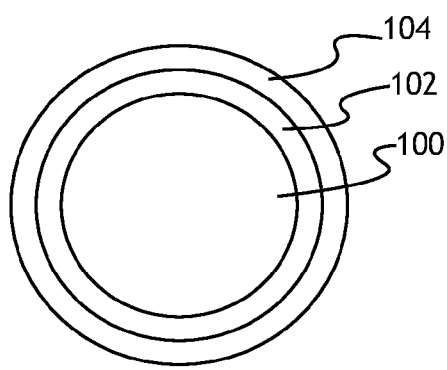
FIG. 8 illustrates a fluidized bed material for use in treatment of an exhaust stream including a bead or pellet having a perovskite catalyst and $NO_x$ storage material coated thereon and an overlying hydrocarbon reduction and $NO_x$ reduction catalyst on the perovskite catalyst and $NO_x$ storage material according to one embodiment of the invention.

FIG. 8 illustrates a fluidized bed material for treatment of an exhaust stream including a bead or pellet portion 100 which may be solid or porous and includes a first layer 102 coated on or over the bead or pellet 100 and a second layer 104 coated on or over the first layer 102.

Figure 9:
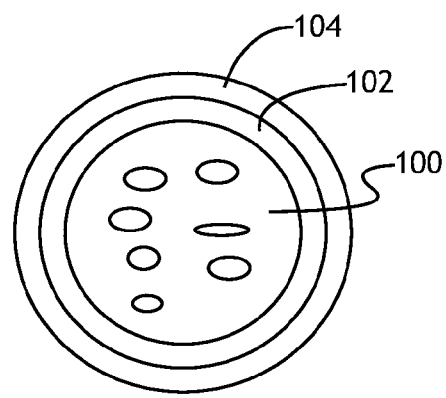
FIG. 9 is a catalyst support bead material similar to that of FIG. 8 wherein the support bead is porous.

In an alternative embodiment, as shown in FIG. 9, the bead or pellet 100 may be porous.

Figure 10:
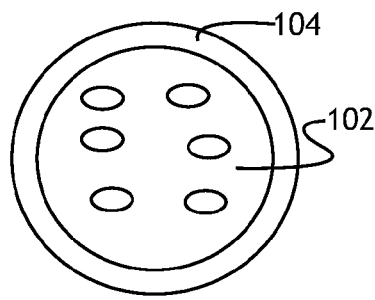
FIG. 10 is a fluidized bed material including a porous bead portion comprising a perovskite and $NO_x$ storage material having a hydrocarbon reduction and $NO_x$ reduction coating thereon according to one embodiment of the invention.

In yet another embodiment, as shown in FIG. 10, the pellet or bead portion may be made from the perovskite and nitrogen trap material 102 and may be porous, and having the hydrocarbon reduction and $NO_x$ reduction catalyst coated thereon or over the same.

Figure 11:
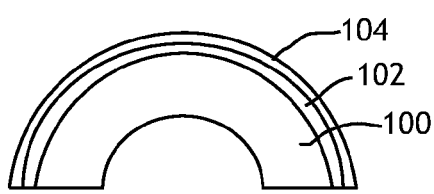
FIG. 11 is a fluidized bed packing material for use in treatment of an exhaust stream including a saddle-shaped substrate having a first layer including a perovskite catalyst and $NO_x$ storage material on the substrate and a hydrocarbon reduction and $NO_x$ reduction catalyst over the first layer according to one embodiment of the invention.

FIG. 11 illustrates another embodiment of a fluidized bed material including a saddle-shaped support substrate 100 having a first layer 102 including a perovskite catalyst and $NO_x$ storage material coated directly thereon or over the substrate 100 and a second layer or zone 104 including a hydrocarbon reduction and $NO_x$ reduction catalyst coated on the first layer or over the first layer 102.

Figure 12:
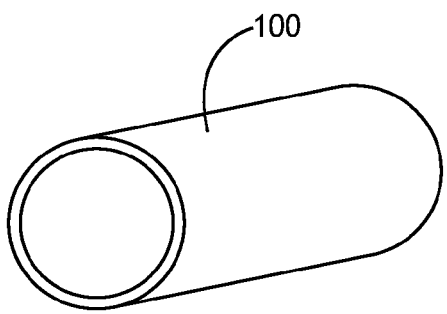
FIG. 12 illustrates another embodiment of a fluidized bed packing material including a ring structure which may have a first layer thereon including a perovskite catalyst and $NO_x$ storage material and a second layer overlying the first layer including a hydrocarbon reduction and $NO_x$ reduction catalyst according to one embodiment of the invention.

FIG. 12 illustrates an alternative fluidized bed support material such as a ring structure which may serve as the support substrate 100 for the perovskite catalyst and $NO_x$ storage material coating and the hydrocarbon reduction and $NO_x$ reduction catalyst coating.

Figure 13:
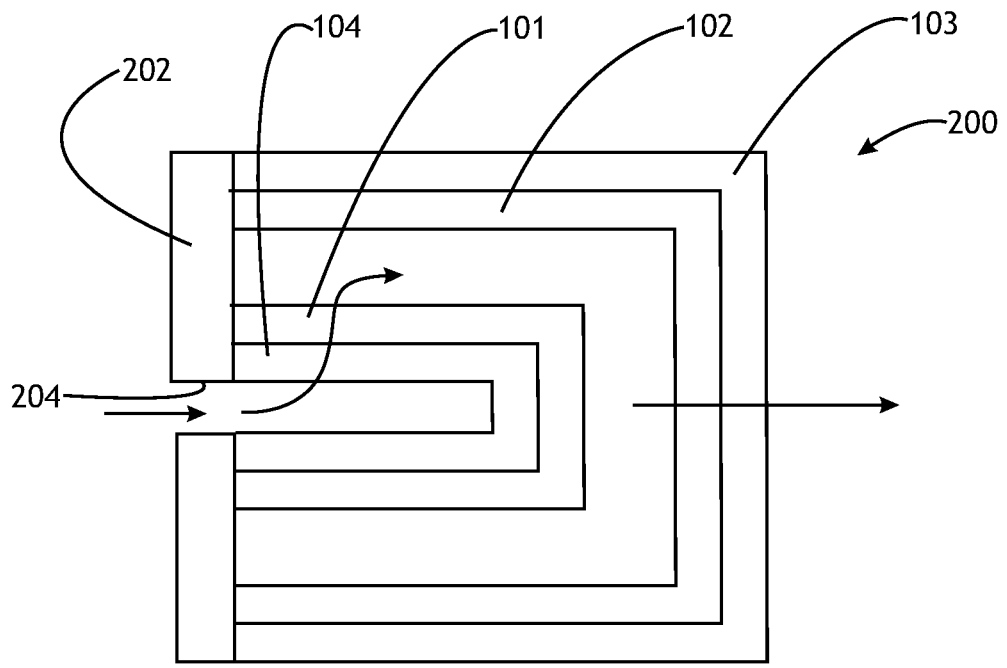
FIG. 13 illustrates a wall flow filter having a first surface including a hydrocarbon reduction and $NO_x$ reduction catalyst on or over the first surface, and a second surface having a perovskite catalyst and a $NO_x$ storage material on or over the second surface according to one embodiment of the invention.

FIG. 13 illustrates a wall flow filter 200 including front plate 202 defining an opening 204 for exhaust gas to flow into and through a first layer or zone including a hydrocarbon reduction and $NO_x$ reduction catalyst carried by a porous wall portion 101 and so that the exhaust gas thereafter flows over a second zone 102 carried by an outer wall portion 103 and wherein the second zone 102 includes a perovskite and nitrogen trap material for $NO_x$ oxidation and storage.

In one embodiment, the second zone 102 may include a combination of a perovskite catalyst and a second catalyst as described in further detail in the paragraphs that follow.

One embodiment of the invention may include a catalyst combination of a perovskite catalyst and a second catalyst that is not a perovskite catalyst. In one embodiment, the perovskite catalyst may have the general formula $ABO_3$, $AA'BO_3$ $ABB'O_3$, $AA'BB'O_3$, or $AA'BB'O_3$. In another embodiment, the second non-perovskite catalyst may comprise at least one metal from the precious metal or noble metal group of the periodic table. In another embodiment, the second non-perovskite catalyst may comprise at least one of palladium, platinum, rhodium or ruthenium, or catalyst systems including the same. In one embodiment, a catalyst combination may include a perovskite catalyst and a second catalyst non-perovskite catalyst, the second catalyst non-perovskite catalyst have a loading of about 1-160 g/ft³, 1-80 g/ft³ʼ 10-60 g/ft³, 1-40 g/ft³, 1-20 g/ft³, or a loading within such ranges. In one embodiment of a catalyst combination comprising a second non-perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second catalyst non-perovskite catalyst comprises platinum having a loading of about 1-160 g/ft³ʼ 1-80 g/ft³, 1-20 g/ft³, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second non-perovskite catalyst, wherein the second non-perovskite catalyst comprises palladium having a loading of about 5-100 g/ft³ʼ or 10-60 g/ft³, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

One embodiment may include treatment of a gas stream that includes $NO_x$ with a perovskite catalyst having the general formula $ABO_3$, $AA'BO_3$ $ABB'O_3$, or $AA'BB'O_3$, in a catalytic oxidation reaction to oxidize nitric oxide in the gas stream.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be not be supported by a substrate but may be formed into substrates having any of a variety of configurations including, but not limited to, flat panels, beads, pellets, or reactor packing material shapes.

In select embodiments, the addition of a second non-perovskite catalyst in a catalyst combination also including a perovskite catalyst improves the perovskite catalyst function. A catalyst combination comprising a perovskite catalyst and a non-perovskite catalyst may allow for oxidation of CO or unburned hydrocarbons in a gas stream. The addition of a second catalyst such as, but not limited to, platinum or palladium may improve NO oxidation and reduce low temperature fouling of the catalyst system. The use of a catalyst combination comprising a perovskite catalyst and a non-perovskite catalyst may improve NO oxidation with less precious metal catalyst being used compared to systems including only precious metal catalysts. In one embodiment, the catalyst combination may be coupled or coated on any of a variety of substrate or the catalyst combination may be formed into substrates. The catalyst combination comprising a perovskite catalyst and a non-perovskite catalyst may be used to treat any gas stream.

One embodiment may include a perovskite catalyst of the general formula $ABO_3$, wherein A represents a rare earth metal from the Lanthanide Series and/or an alkaline-earth metal (La, Sr, Ce, Ba, Pr, Nd, or Gd) and wherein B represents a transition metal (Co, Ni, Cu, Zn, Cr, V, Pt, Pd, Rh, Ru, Ag, Au, Fe, Mn, or Ti).

But as stated above, the perovskite catalyst may be provided on a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be formed into substrates of any of a variety of configurations including, but not limited to, flat panels, beads, pellets, flow-through or wall-flow monoliths, or reactor packing material shapes. Packing material shape may include, but are not limited to, rings, saddles, hollow cylinders or Raschig rings.

The perovskite catalyst primarily functions to oxidize nitric oxide (NO) to nitrogen dioxide ($NO_2$). Two exemplary perovskite catalysts of the general formula $ABO_3$ that may be utilized in the catalytic oxidation reactor 14 include $LaCoO_3$ and $LaMnO_3$.

In another exemplary embodiment, the catalytic performance of the perovskite catalyst of the general formula $ABO_3$ as described above may be enhanced by the substitution of a small amount of a promoter material for a portion of element A or element B in the catalytic formulation. Solid solutions of $ABO_3$ with $AA'BO_3$, or even $AA'BB'O_3$, may be utilized, wherein A' signifies a substitution of the promoter material for a portion of the A element, and wherein B' represents a substitution of the promoter material for a portion of the B element.

One illustrative promoter material is Strontium (Sr), and an exemplary formulation is $ASrBO_3$, wherein A and B are described as above. Two exemplary perovskite catalysts including the Strontium promoter material that may be utilized in the catalytic oxidation reactor 14 include $La_{1-x}Sr_xCoO_3$ and $La_{1-x}Sr_xMnO_3$.

EXAMPLES

Catalyst Preparation $La_{1-x}Sr_xCoO_3$ (x=0, 0.1, 0.2, 0.3) and $La_{1-x}Sr_xMnO_3$ (x=0, 0.1) catalysts were prepared by citrate methods as shown in Table 1 below. In the methods, appropriate amounts of $La(NO_3)_3 \cdot 6H_2O$, $Co(NO_3)_2 \cdot 6H_2O$, $Mn(NO_3)_2$ solution, and $Sr(NO_3)_2$ were dissolved in distilled water with citric acid monohydrate. Citric acid was added in about a 10 weight percent excess to ensure complete complexation of the metal ions. The amount of water used was about 46.2 mL/g $La(NO_3)_3 \cdot 6H_2O$. The solution was set on a stirring and heating plate and stirred for 1 hour, then heated to about 80 degrees Celsius under continued stirring.

TABLE 1

|  | $LaCoO_3$ | $La_{0.9}Sr_{0.1}CoO_3$ | $LaMnO_3$ |
| --- | --- | --- | --- |
| $La(NO_3)_3 \cdot 6H_2O$ | 17.61 g | 35.62 g | 27.60 g |
| $Sr(NO_3)_2$ | — | 1.93 g | — |
| $Co(NO_3)_2 \cdot 6H_2O$ | 11.84 g | 26.60 g | — |
| $Mn(NO_3)_2$ | — | — | 14.14 g |
| $C_6H_8O_7 \cdot H_2O$ | 15.67 g | 34.51 g | 24.56 g |
| Deionized $H_2O$ | 825 ml | 1820 ml | 1275 ml |

During the preparation, water was evaporated until the solution became a viscous gel and just began evolving $NO_2$ gas. The gel was then placed overnight in an oven set at about 90 degrees Celsius. The resulting spongy material was crushed and calcined at about 700 degrees Celsius for about 5 hours in static air. The temperature was ramped at a rate of about 10 degrees Celsius per minute. When the temperature reached just below about 300 degrees Celsius, the citrate ions combusted vigorously, causing a larger spike in temperature and powder displacement. For this reason the powder was covered with several layers of $ZrO_2$ balls (the same as used for ball milling) to prevent powder displacement, but still allow gas mobility. After calcination, the powder was ball milled with about 6.33 mL water/g powder for about 24 hours. Afterward, the slurry was stirred continuously, and about 0.33 mL of 0.1 M $HNO_3$/g powder and about 5 mL water/g powder was added to the slurry. The resulting washcoat solution had a concentration of about 0.114 gram catalyst/mL solution.

A cordierite substrate was dipped in the washcoat solution and excess liquid removed, and the wet substrate was set horizontally in an oven set to about 200 degrees Celsius for about 30 minutes. This procedure was repeated until the desired loading was obtained. Finally, the catalyst was calcined at about 700 degrees Celsius for about 5 hours with an air flow of about 100 sccm.

One embodiment of the invention may include a method comprising providing a product comprising a substrate comprising a perovskite catalyst, $NO_x$ stored in or on the substrate and particulate matter in or on the substrate; releasing at least some of the stored $NO_x$ and oxidizing the released NOx to form $NO_2$, and reacting the $NO_2$ with carbon in the particulate matter to form at least one of CO or $CO_2$ In another embodiment the substrate further comprises a noble metal catalyst.

In another embodiment the substrate further comprises platinum.

In one embodiment the substrate does not include a catalyst other than the perovskite catalyst.

In one embodiment the product may further comprise a $NO_x$ storage material.

One embodiment of the invention includes a method comprising providing a particulate filter comprising a substrate comprising a perovskite catalyst, $NO_x$ stored in or on the substrate and particulate matter in or on the substrate; releasing at least some of the stored $NO_x$ and oxidizing the released $NO_x$ to form $NO_2$, and reacting the $NO_2$ with carbon in the particulate matter to form at least one of CO or $CO_2$ In one embodiment the particulate filter is located in a combustion engine exhaust system.

One embodiment of the invention may include a product comprising a particulate filter and $NO_x$ storage material combination, wherein the particulate filter comprises a substrate constructed and arranged to trap particulate matter in a gas stream flowing in, through or over the substrate, and further comprising a $NO_x$ storage material in, on or over the substrate and a perovskite catalyst in, on or over the substrate.

Some embodiments may use combinations of a perovskite catalyst, $NO_x$ storage materials with or without non-perovskite catalyst in a product which may be constructed and arranged to trap particulate matter as desired. Such embodiments may be used to treat gas streams such as, but not limited to, exhaust gas from an engine utilizing gasoline, diesel or other fuels, gases from the operation of a chemical plant or chemical processing equipment, or gases from chemical laboratories or medical devices.

The above description of embodiments of the invention is merely exemplary in nature and, thus, variations thereof are not to be regarded as a departure from the spirit and scope of the invention.

What is claimed is:

1. A product comprising:
a combustion engine and exhaust treatment system wherein the combustion engine produces exhaust comprising particulate matter and $NO_x$, the system comprising an engine and a catalytic converter downstream of the engine; a combination particulate filter and $NO_x$ storage component; the particulate filter comprising a perovskite catalyst and a $NO_x$ storage material, and constructed and arranged so that particulate matter from the combustion engine exhaust is trapped in the particulate filter and $NO_x$ is stored in the $NO_x$ storage material wherein the particulate filter comprises a second non-perovskite catalyst comprising platinum and the perovskite catalyst comprises an alkaline earth metal.

2. A product as set forth in claim 1 wherein the perovskite catalyst and $NO_x$ storage material are in the same layer.

3. A product as set forth in claim 1 wherein the perovskite catalyst and $NO_x$ storage material are in different layers or sections of the substrate or product.

4. A product as set forth in claim 1 wherein the $NO_x$ storage material comprises an alkaline earth metal rare earth based oxide comprising $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

5. A product comprising a combination of particulate filter and $NO_x$ storage component; the particulate filter comprising a perovskite catalyst and a $NO_x$ storage material, and constructed and arranged so that particulate matter from combustion engine exhaust is trapped particulate filter and $NO_x$ is stored in the $NO_x$ storage material wherein the particulate filter comprises a second non-perovskite catalyst comprising platinum and the perovskite catalyst comprises an alkaline earth metal.

6. A product as set forth in claim 5 wherein the perovskite catalyst and $NO_x$ storage material are in the same layer.

7. A product as set forth in claim 5 wherein the perovskite catalyst and $NO_x$ storage material are in different layers or sections of the substrate or product.

8. A method as set forth in claim 5 wherein the perovskite catalyst has the general formula $ABO_3$, $AA'BO_3$, $ABB'O_3$, or $AA'BB'O_3$, wherein A comprises an alkaline-earth metal and wherein B comprises a transition metal.

9. A method as set forth in claim 8, wherein said perovskite catalyst has the general formula $AA'BO_3$;
wherein A comprises an alkaline-earth metal;
wherein B comprises a transition metal; and
wherein A' comprises a substitution of a promoter material for a portion of A.

10. A method as set forth in claim 8, wherein said perovskite catalyst has the general formula $ABB'O_3$,
wherein A comprises an alkaline-earth metal;
wherein B comprises a transition metal; and
wherein B' comprises a substitution of a promoter material for a portion of B.

11. A method as set forth in claim 8, wherein said perovskite catalyst has the general formula $AA'BB'O_3$,
wherein A comprises an alkaline-earth metal;
wherein B comprises a transition metal;
wherein A' comprises a substitution of a promoter material for a portion of A; and
wherein B' comprises a substitution of a promoter material for a portion of B.

12. A method as set forth in of claim 11, wherein A' comprises Strontium.

13. A product as set forth in claim 8, wherein B is Cobalt or Manganese or Iron.

14. A product as set forth in claim 5 wherein the $NO_x$ storage material comprises a rare earth based oxide comprising $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

15. A method comprising providing a product comprising a particulate filter comprising a substrate comprising perovskite catalyst, $NO_x$ stored in or on the substrate and particulate matter in or on the substrate; releasing at least some of the stored $NO_x$ and oxidizing the released NOx to form $NO_2$, and reacting the $NO_2$ with carbon in the particulate matter to form at least one of CO or $CO_2$ wherein the product comprises a second non-perovskite catalyst comprising platinum and the perovskite catalyst comprises an alkaline earth metal.

16. A method as set forth in claim 15, wherein the substrate further comprises a noble metal catalyst.

17. A method as set forth in claim 15, wherein the product may further comprise a $NO_x$ storage material.

18. A product as set forth in claim 15 wherein the substrate further comprises a nitrogen trap material comprises a rare earth based oxide comprising $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

19. A method comprising providing a particulate filter comprising a substrate comprising a perovskite catalyst, $NO_x$ stored in or on the substrate and particulate matter in or on the substrate; releasing at least some of the stored $NO_x$ and oxidizing the released $NO_x$ to form $NO_2$, and reacting the $NO_2$ with carbon in the particulate matter to form at least one of CO or $CO_2$ wherein the particulate filter comprises a second non-perovskite catalyst comprising platinum and the perovskite catalyst comprises an alkaline earth metal.

20. A product as set forth in claim 19 wherein the substrate further comprises a nitrogen trap material comprises a rare earth based oxide comprising $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

21. A product comprising a particulate filter and $NO_x$ trap combination, wherein the particulate filter comprises a substrate constructed and arranged to trap particulate matter in a gas stream flowing in, through or over the substrate, and further comprising a trap material in, on or over the substrate and a perovskite catalyst in, on or over the substrate wherein the particulate filter and $NO_x$ trap combination comprises a second non-perovskite catalyst comprising platinum and the perovskite catalyst comprises an alkaline earth metal.

22. A product as set forth in claim 21 wherein the nitrogen trap material comprises a rare earth based oxide comprising $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

* * * * *